United States Patent [19]

Baumbusch et al.

[11] Patent Number: 5,704,262
[45] Date of Patent: Jan. 6, 1998

[54] MULTIPLE-SPINDLE LATHE

[75] Inventors: Frank Baumbusch, Erzhausen; Egon Strathmeier, Langen; Bodo Haupt, Bensheim; Frank Kieselbach, Langen, all of Germany

[73] Assignee: PCC Pittler Maschinenfabrik GmbH, Langen, Germany

[21] Appl. No.: 680,879

[22] Filed: Jul. 16, 1996

Related U.S. Application Data

[63] Continuation of Ser. No. 240,746, filed as PCT/EP92/02487, Oct. 30, 1992 published as WO93/09901, May 27, 1993, abandoned.

[30] Foreign Application Priority Data

Nov. 11, 1991 [DE] Germany ............... 41 36 916.5

[51] Int. Cl.⁶ ......................................... B32B 13/04
[52] U.S. Cl. ................................... 82/124; 82/129
[58] Field of Search ......................... 82/117, 120, 121, 82/124, 129, 125; 29/36

[56] References Cited

U.S. PATENT DOCUMENTS

| | | | |
|---|---|---|---|
| 3,821,835 | 7/1974 | St. Andre et al. | 29/36 |
| 4,457,193 | 7/1984 | Matthey | 82/124 X |
| 4,597,155 | 7/1986 | Garnett et al. | 29/36 X |
| 4,612,690 | 9/1986 | Baker | 82/124 X |
| 4,612,832 | 9/1986 | Ushigoe et al. | 82/129 |
| 4,665,781 | 5/1987 | Eichenhofer et al. | 82/129 |
| 4,719,676 | 1/1988 | Sansone | 29/36 X |
| 4,739,872 | 4/1988 | Roberts et al. | 82/125 X |
| 4,763,549 | 8/1988 | Hata et al. | 82/124 |
| 4,821,402 | 4/1989 | Kosho et al. | 82/125 X |
| 5,025,690 | 6/1991 | Myers | 82/121 |
| 5,083,485 | 1/1992 | Link et al. | 82/129 X |
| 5,127,140 | 7/1992 | Oiwa et al. | 82/129 X |

FOREIGN PATENT DOCUMENTS

| | | |
|---|---|---|
| 33 37 198 | 5/1985 | Germany . |
| 34 16 660 | 9/1987 | Germany . |
| 0114801 | 7/1983 | Japan ............... 82/125 |
| 402131801 A | 5/1990 | Japan ............... 82/124 |

OTHER PUBLICATIONS

Brinkman Information Mar. 1983, Der Kleine Unterschied.
Brinkman Information Jun. 1983, Richtungweisend auf dem Wege zur Vollautomation, Brinkmann–promot.
Brinkman, Doppelspindel CNC–Drehautomat DC 250–2.
Schutte, Zweispindel–Futterautomat ZA, Anlege 1.
Schutte, Zweispindel–Futterautomat "ZA", Anlage 2.

*Primary Examiner*—Daniel W. Howell
*Assistant Examiner*—Henry W. H. Tsai
*Attorney, Agent, or Firm*—Larson & Taylor

[57] ABSTRACT

The multiple-spindle lathe described has at least two parallel-acting workpiece spindle units mounted to move in the X and Z directions. The spindle units operate in conjunction with fixed workpiece carriers and themselves convey the workpieces to and from a workpiece-turning means so that there is no need for an automatic conveyor to feed the workpieces between the two spindle units.

9 Claims, 2 Drawing Sheets

MULTIPLE-SPINDLE LATHE

This application is a continuation of application Ser. No. 08/240,746, filed as PCT/EP92/02487, Oct. 30, 1992 published as WO93/09901, May 27, 1993 now abandoned.

BACKGROUND OF THE INVENTION

The invention relates to a multiple-spindle lathe comprising at least two parallel-acting workpiece spindle units positioned parallel next to each other so as to be able to move independently of each other in the direction of the X and Z axis, and each of which can be driven in the X direction between a working position, in which each of them cooperates with a tool carrier, and a transfer position.

DESCRIPTION OF THE PRIOR ART

The longitudinal lathing or facing of workpieces requires relative movements between workpiece and tool in the direction of the X and Z axis, i.e. transverse and parallel to the longitudinal axis of the workpiece spindle. In principle, either the workpiece spindle unit or the tool carrier is able to execute both movements, or each of the units is able to execute only one movement in the direction of one of these two axes. Each of these four theoretical options is realized in single-spindle lathes.

Further requirements must be met by multiple-spindle lathes. These are used as automatic production machines and usually are operated so as to perform different procedures on workpieces that have been passed from one spindle to another. Hereby the transport and transfer of the workpieces from one workpiece spindle unit to the next constitutes a decisive factor regarding the economy of the machines. The fact that treatment on both sides requires the workpieces to be turned in many cases, the realization of short non-productive and conversion times, the construction expenditure for the conveying drives and transport devices, the space requirement, accessibility of work space, necessity of protective means, shavings removal, integration into production lines, and other conditions resulting from the cooperation of several workpiece spindle units and the production automation deserve special attention in this context. These present so many factors mutually influencing each other that optimization is hard to realize.

Known front-operated multiple lathes comprising parallel-acting workpiece spindle units that are fixed in a parallel row and controllable tools require complex workpiece transport devices. To facilitate at least the transfer between two workpiece spindles, DE-A-33 20 940 proposes that one workpiece spindle unit be fixed and an adjoining one be arranged so as to act in the opposite direction and be movable in two axes. In this case, both of the workpiece spindle units can be aligned so that the workpieces can be transferred directly and at the same time be turned. A similar arrangement for the same purpose is shown in DE-A-38 12 642. There, two workpiece spindle units acting in opposite directions can be moved coaxially. The movement in the direction of the X axis is performed by two juxtaposed tool turrets. DE-A-38 03 219 also provides two confronting workpiece spindles to be aligned coaxially for workpiece transfer, which, like the associated tool supports, can each be moved only in one axial direction. One workpiece spindle unit is moved in the X direction, and the other in the Z direction.

All of these designs are particularly favorable in view of the workpiece transfer from the first to the second workpiece spindle unit with simultaneous turning of the workpiece. On the other hand, the moving together of all units results in disadvantages related to the accessibility, space requirement, feeding and removal of the workpieces, and the linking with additional machining stations. In addition, guides of workpiece spindle units and/or tool supports are always present in the work space and must be covered flexibly to prevent wear.

The prospectus "EMAC MSC 02" from 1991 introduces a front-operated two-spindle automatic lathe with parallel juxtaposed, equally oriented workpiece spindle units, each of which can only be moved in the direction of the Z axis. The movement in the X direction is performed by the tool carriers whose guides are located in the work space and must be covered. Relatively complicated additional devices for automatic loading and unloading as well as for the transfer of the workpieces are also necessary.

The latter also would be true for another known lathe according to DE-U-87 00 343, in which two workpiece spindle units can be moved next to each other and with the same alignment both in the X and the Z direction so that the tool carrier can be fixed, but where both workpiece spindle units only can be moved together and work with a tool carrier common to both. If the biaxial movement of the workpiece spindle units in this design should be used for the loading and unloading and the transfer of the workpieces, this would result in very long non-productive times, since both head stocks must perform all movements together.

The invention is based on the lathe described in DE 33 37 198 A1. The latter consists of two parallel rows of respectively aligned, relatively short guides in the direction of the X axis, with free spaces in each row. The guides of one row each face a free space in another row, but are longer than this space. A workpiece spindle unit is positioned movably on each guide. The front ends of the spindles face each other in both rows. Except for the workpiece spindle units at one end of each row, the spindles can be driven into two transfer positions at the ends of their guides, where they align with one of two workpiece spindle units adjoining and facing each other, so that a workpiece can be transferred by direct axial transfer from one workpiece spindle unit of one row to a workpiece spindle unit of the other row, and after the latter's process can be transferred again back in the X direction to a workpiece spindle unit of the first row. Between the two rows are located tool carriers, each of which is associated with three workpiece spindle units that are arranged so as to face them offset at an angle, and, since they are active in the transfer positions, must be retracted or swiveled away prior to the transfer.

The known multiple-spindle lathe has the significant deficiency that the work space between the two rows of the workpiece spindle units is poorly accessible. Observation and operation tool change, conversion to other machining tasks, and maintenance are made much harder by this. In principle, this is also true for all known lathes in which two workpiece spindle units face each other in such a way that they can be driven into a coaxial transfer position in order to directly transfer tools from one to the other spindle and simultaneously turn them. In addition, there are always guides of workpiece spindle units and/or tool supports in the work space, which must be covered flexibly in order to prevent wear—a deficiency also, inevitably, suffered by known front-operated two-spindle lathes with tool carriers that can be driven in the X direction.

SUMMARY

The invention thus is based on the task of creating a multiple-spindle lathe whose work space can be easily defined by simple means, but is well accessible and observable, as well as simple loading, unloading, transfer and, potentially, turning devices, and which facilitates the latter's conversion.

According to the invention said task is solved in that each workpiece spindle unit is separately associated with a fixed tool carrier, and that two adjoining workpiece spindle units cooperate in the transfer position, which is located between the associated working positions, with a mutual transfer or turning device or a pick-up and change station.

The invention offers the advantage that the spindle units that are able to move biaxially independently from each other are able to take over a significant part of the functions of the loading and unloading as well as transfer and, potentially, turning devices, whereby a control device of the workpiece spindle units present in any case can be utilized. If a turning device is supposed to be provided, it may be very small and simple, since both spindle heads move towards it in the X direction and are able to put down or pick up a workpiece in the Z direction. Depending on the type of workpieces, the material flow is able to continue with simple transport devices in the X direction from one workpiece spindle unit to the next, whereby it is e.g. possible that one spindle picks up a workpiece on one side of the fixed tool carrier and is able to transfer it on the other side to the next spindle by using a transfer or turning device. Alternatively, a pick-up and transfer station that can be used by both workpiece spindle units may be located between the tool carriers. A conversion of the machine for other tasks, e.g. where two spindles in parallel operation take over the machining of one side of a workpiece requiring a longer time, whereupon a third spindle unit machines the other side of all workpieces is readily possible, since the spindle units can be recontrolled simply and quickly for other pick-up, transfer, and release positions.

Although other advantageous properties of the new lathe are also found in other machines, their combination maximizes the overall utility. It should be emphasized that all workpiece spindle units with slides and feed drives can be identical. They can be positioned on a common continuous guide. The work space can be separated in front of the slide guides of the head stocks with a vertical wall, so that the guides need not be covered. In the work space, all parts are readily accessible from the front since it can be flat, and the devices for loading and unloading as well as transferring the workpieces require only little space, due to the fact that the movable spindle units realize a significant part of the transport and transfer between the spindles. If rotatable tool carriers are used, the tools not currently being used also can be changed during machining.

To execute a complete machining of both sides of a flat workpiece, the invention using the new multiple-spindle lathe suggests a procedure that is characterized in that a first workpiece spindle unit loads a workpiece at one loading station by moving in the Z direction, that after a movement of the workpiece in the X direction into a first work station the workpiece is guided into the X and/or the Z direction during a first machining step, that the workpiece subsequently is transported through the first workpiece spindle unit in the X direction to a turning device and is transferred to it by movement in the Z direction, and is then turned in the turning device by 180°, is then loaded by a second, parallel and equally oriented workpiece spindle unit at the side of the first one, by way of movement in the Z direction of the second workpiece spindle unit is transported by the movement of the latter in the X direction to a second work station, is guided there in the X and/or the Z direction by the second workpiece spindle unit during a second machining step, and is finally transferred by it to an unloading device through movements in the X and the Z direction.

DESCRIPTION OF THE DRAWINGS

An embodiment of the invention is explained in more detail below in reference to the drawings.

DESCRIPTION OF THE PREFERRED EMBODIMENTS

Figure 1:
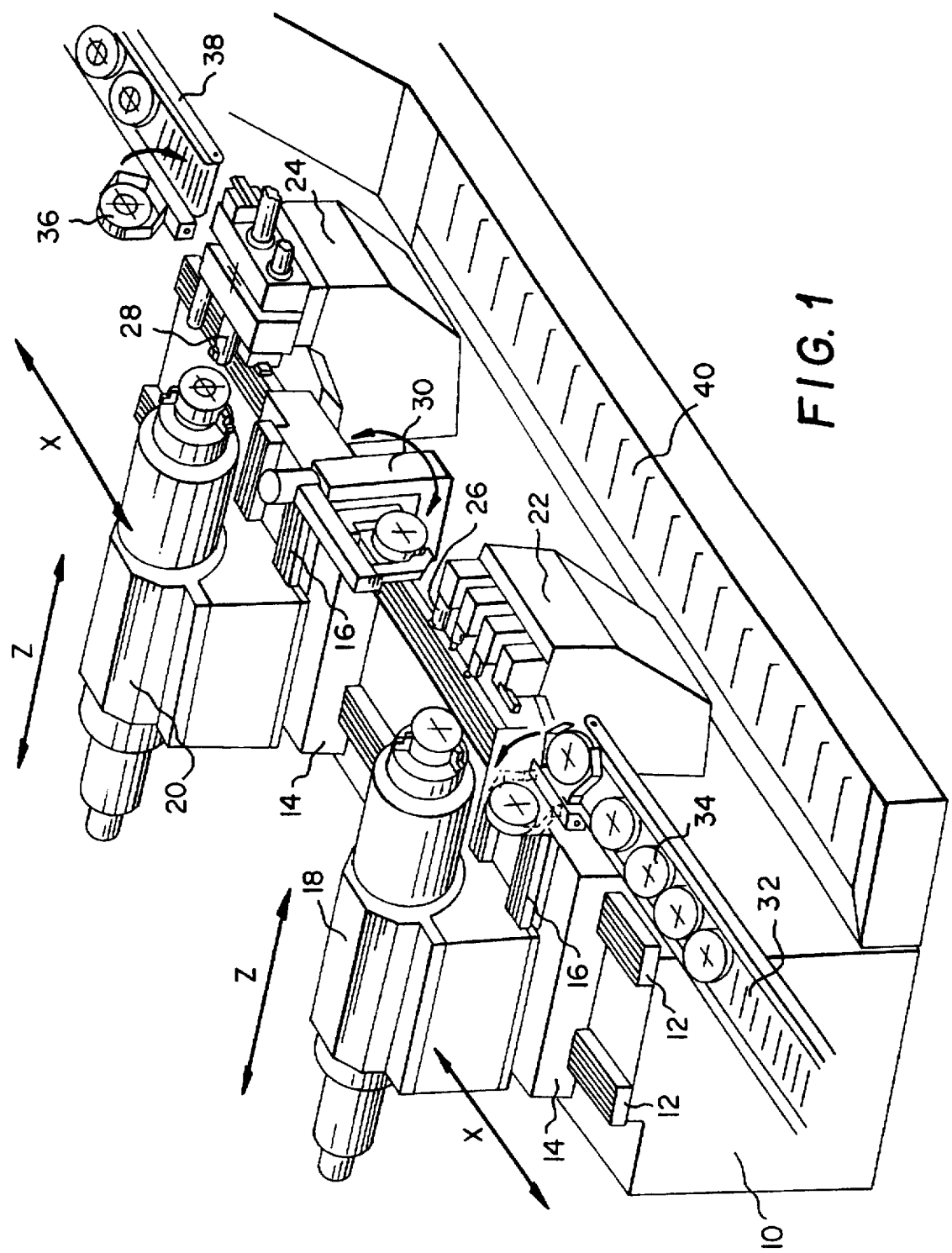
FIG. 1 shows an angled perspective view of a two-spindle lathe from the front.

The machine shown as an embodiment exhibits an elongated bed 10 with a longitudinal guide 12 on the top. It extends essentially over the entire length of the bed 10. In the embodiment, two compound slides 14 are guided on it, each of which having on its top a guide 16 that extends transversely to the longitudinal guide 12. A first workpiece spindle unit 18 is positioned movably on the guide 16 of the compound slide 14 that is on the left side in reference to the drawing. In the same manner, a second workpiece spindle unit 20 sits on the right compound slide 14. Both workpiece spindle units 18, 20 can—but must not necessarily be—identical.

The basic structure of such workpiece spindle units as they are shown schematically in the drawing is known e.g. from EP-B 94 680, EP-B 84 271, and EP-A 381 009, so that no detailed discussion is necessary in this respect. The workpiece spindle units 18, 20 both have at their front end in a known manner a workpiece clamping device in the form of a chuck. The workpieces grasped by it are rotated by the workpiece spindle units 18, 20 during machining.

The front of the bed 10 holds two tool carders 22, 24 in fixed arrangement. The tools 26, 28 inserted into them are fixed during a machining process. If, as shown for 28, the tools are inserted into a multi-sided, rotatable tool holder, the tools on the side of the tool holder not being operated can be changed during an ongoing machining process.

A workpiece turning device 30 is attached on the bed 10 between the two tool carriers 22, 24. It simply consists of a frame that can be rotated back and forth by 180° about a vertical axis and temporarily can accept and hold a workpiece.

A conveyor 32 transports the workpieces 34 to be machined to a loading station to the left of the tool carrier 22. It is sufficient if it is ensured that the conveyor 32 transports the workpieces 34 into a coaxial position in front of the spindle of the first workpiece spindle unit 18. As shown, this can be achieved with a flap that brings the workpieces that arrive lying down into upright position, whereby they are also brought to the correct height for pick-up by the spindle, or, alternatively, the workpieces are rolled directly in their upright position to the front of the spindle. The loading itself can be achieved in any case by movements of the workpiece spindle unit 18. Analogously, the finished workpieces 36 can be unloaded by movements of the second workpiece spindle unit 20 at the right end of the machine onto another conveyor 38.

To machine the workpieces 34, they are taken from the conveyor 32 at the loading station on the left side of the machine by way of the clamping device of the first workpiece spindle unit 18. No transfer device is needed for this purpose, since the workpiece spindle unit 18 can be moved in the direction of the Z axis along the guide 16 of its compound slide 14. A movement of the compound slide 14 along the longitudinal guide 12, i.e., in direction of the X axis, then causes the workpiece spindle unit 18 to be driven into a working position relative to the tool carrier 22. The lathing of one side of the workpieces 34 is performed with the tools 26, whereby the necessary relative movements between workpiece and tool are brought about by the controlled movement of the workpiece spindle unit 18 in the X direction along guide 12 and/or in the Z direction along guide 16.

After the workpieces have been machined on one side, the transport to the next workpiece spindle unit 20 takes place without an additional transport device. The first workpiece spindle unit 18 moves the workpiece by way of another movement in the X direction to the turning device 30, and transfers it to the latter by moving in the Z direction. This turning device need only turn the workpiece, whereby, in a manner different from that shown, it also can be turned about a horizontal axis. Depending on the design of the turning device 30, the second workpiece spindle unit 20 already may have been moved up to it by this time. Since the latter also is able to move in the Z direction, it is able to itself take over the workpiece directly from the turning device 30, execute the workpiece movements required for the machining process in cooperation with the fixed tools 28, and finally lay down the finished workpiece 36 by way of a flap on the conveyor 38.

Figure 2:
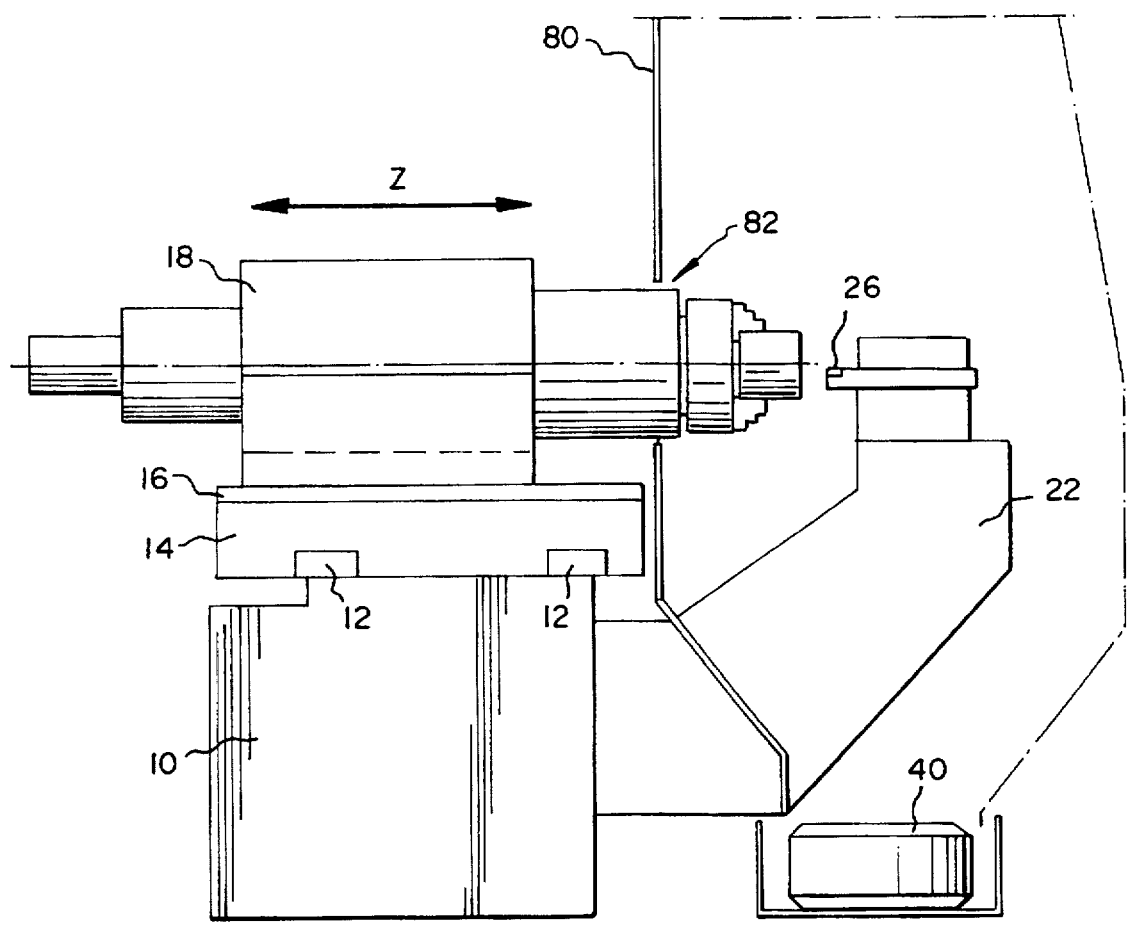
FIG. 2 shows a side view of the embodiment shown in FIG. 1.

In order to be able to show the workpiece spindle units, their guides, the tools, as well as the turning devices and conveyors for the feeding and removing of the workpieces, the dividing walls of the work space are not shown in FIG. 1. It can however easily be seen in FIG. 2 that a vertical wall 80 with movable elements through which the front ends of the workpiece spindles extend through hole 82 can be arranged in front of the compound slide 14, so that all guides are located behind the dividing wall and thus outside the work space. For this reason, they need not be covered.

In a different manner from the drawn embodiment, it is also possible that more than two workpiece spindle units can be positioned on a one-part or multi-part machine bed so as to be movable in the X and the Z direction in the shown manner. In some cases, an interruption of the machine bed and longitudinal guide 12 between two workpiece spindle units is useful in order to prevent them from adverse mutual interferences, e.g. the transmission of vibrations generated during an interrupted cut. In further modifications, the Z axis does not extend horizontally but vertically or is angled. Accordingly, the direction of the rotation axis of the turning device changes also. Finally, it should be noted that it is possible that instead of the shown flat coulisses 12 and 16 other suitable bearings for the workpiece spindle units can be used.

The shavings are preferably removed along the front of the machine bed using a conveyor 40.

We claim:

1. A multi-spindle horizontal lathe comprising:
   first and second workpiece spindle units positioned parallel, equally oriented, and adjacent to each other wherein said adjacent spindle units work on a workpiece consecutively;
   means for permitting horizontal movement of each of said first and second workpiece spindle units independently of one another in the X direction, said X direction being transverse to the spindle axes of said spindle units, between a working position for working on said workpiece held by a respective spindle unit and a transfer position for transferring said workpiece from one of said spindle units to the other, the transfer position of said first spindle unit being at or adjacent to the transfer position of said second spindle unit;
   a first tool carrier in a fixed position for carrying a tool for working on said workpiece held by said first spindle unit in the working position of said first spindle unit;
   a second tool carrier in a fixed position for carrying a tool for working on said workpiece held by said second spindle unit in the working position of said second spindle unit;
   means for turning a workpiece by 180° such that said workpiece can be transferred from said first spindle unit to said second adjacent spindle unit so that an opposite face of said workpiece can be worked on by said second adjacent spindle unit consecutively;
   means for permitting movement of each of said first and second workpiece spindle units independently of one another in the Z direction, said Z direction being parallel to the spindle axes of said spindle units, for working in cooperation with a respective tool carrier, on said workpiece held by a respective spindle unit in its respective working position and for directly transferring said workpiece between a respective spindle unit in a respective transfer position and said workpiece turning means.

2. A multiple-spindle lathe as claimed in claim 1 further comprising:
   workpiece clamping means located at respective working ends of said first and second horizontal workpiece spindle units for holding said workpiece during working and transfer of a workpiece; and
   a work space defined by walls, wherein said workpiece spindle units extend through holes in said walls such that said working ends are located within said work space.

3. A multiple-spindle lathe as claimed in claim 1 wherein said spindle units are positioned so as to be moveable in the Z direction along slides that can be driven along a mutual guide in the X direction.

4. A multiple-spindle lathe as claimed in claim 3 wherein said turning means comprises means for turning said workpiece 180 degrees about a vertical axis.

5. A multiple-spindle lathe as claimed in claim 1 wherein said working position of each of said first and second spindle units is located between said transfer position and a loading position for loading said workpiece onto a spindle unit or an unloading position for unloading said workpiece from a spindle unit.

6. A process for working a workpiece on a multiple-spindle unit horizontal lathe comprising:
   loading said workpiece on a first spindle unit of said lathe in a loading position by moving said first spindle unit in a Z direction parallel to the spindle axes of multiple spindle units, said first spindle unit being horizontally movable in said Z direction and in an X direction transverse to the spindle axes of said spindle units between said loading position, said working position for working on a workpiece held by said first spindle unit, and a transfer position for transferring said workpiece from said first spindle unit to a workpiece turning device;
   moving said first spindle unit in said X direction to said working position of said first spindle unit;
   working on said workpiece in the working position of said first spindle unit by moving, in at least one of the X and Z directions, said workpiece in relation to a first fixed tool carrier;

moving said first spindle unit in said X direction to the transfer position of said first spindle unit;

transferring said workpiece from said first spindle unit at the transfer position of said first spindle unit to a workpiece turning device by movement of said first spindle unit;

actuating said workpiece turning device to turn the workpiece transferred thereto;

transferring said workpiece from said turning device to said second spindle unit located in a transfer position of said second spindle unit, said second spindle unit being movable horizontally in said X direction between said second transfer position of said second spindle unit, a working position of said second spindle unit for working on said workpiece held by said second spindle unit, and an unloading position;

moving said second spindle in said X direction to said working position of said second spindle unit;

working on said workpiece at said working position of said second spindle unit by moving, in at least one of the X and Z directions, said workpiece in relation to a second fixed tool carrier;

moving said second spindle unit in said X direction to said unloading position; and unloading said workpiece from said second spindle unit in said unloading position by moving the second spindle unit in the Z direction.

7. The process as claimed in claim 6 wherein said actuating step comprises turning said workpiece about a vertical axis.

8. The process as claimed in claim 7 wherein said workpiece is turned about 180 degrees.

9. A multiple-spindle lathe according to claim 1, wherein said Z axis is parallel to the horizontal plane and said first and second workpiece spindle units are oriented along said Z axis.

* * * * *